United States Patent [19]

Harasta et al.

[11] 4,426,431
[45] Jan. 17, 1984

[54] RADIATION-CURABLE COMPOSITIONS FOR RESTORATIVE AND/OR PROTECTIVE TREATMENT OF PHOTOGRAPHIC ELEMENTS

[75] Inventors: Louis P. Harasta, Rochester; Gerald M. Leszyk, Spencerport; Edward D. Morrison, Rochester, all of N.Y.

[73] Assignee: Eastman Kodak Company, Rochester, N.Y.

[21] Appl. No.: 421,694

[22] Filed: Sep. 22, 1982

[51] Int. Cl.³ .................. G03C 1/78; G03C 1/76; G03C 1/68; C08F 2/46
[52] U.S. Cl. .................................. 430/14; 430/272; 430/280; 430/432; 430/532; 430/535; 430/536; 430/938; 430/961; 106/287.14; 106/287.16; 428/413; 428/447
[58] Field of Search ............... 430/14, 272, 280, 432, 430/532, 535, 536, 961, 938, 66; 204/159.13; 428/413, 447; 106/287.16, 287.14

[56] References Cited

U.S. PATENT DOCUMENTS

| | | | |
|---|---|---|---|
| 3,753,755 | 8/1973 | Olson | 117/3.1 |
| 4,025,348 | 5/1977 | Tsukada et al. | 96/115 R |
| 4,025,407 | 5/1977 | Chang et al. | 204/159.14 |
| 4,049,861 | 9/1977 | Nozari | 428/220 |
| 4,092,173 | 5/1978 | Novak et al. | 96/119 R |
| 4,101,513 | 7/1978 | Fox et al. | 526/193 |
| 4,156,035 | 5/1979 | Tsao et al. | 427/44 |
| 4,156,046 | 5/1979 | Lien et al. | 428/220 |
| 4,171,979 | 10/1979 | Novak et al. | 96/119 R |
| 4,256,828 | 3/1981 | Smith | 430/280 |
| 4,293,606 | 10/1981 | Zollinger et al. | 428/203 |
| 4,333,998 | 6/1982 | Leszyk | 430/12 |

OTHER PUBLICATIONS

"Photoinitiated Cationic Polymerization", by S. Peter Pappas, Proceedings–Radiation Curing V, Soc. Mfg. Eng., Sep. 23-25, 1980.
"New Developments in Photo–Induced Cationic Polymerization", by William C. Perkins, Proceedings–Radiation Curing V, Soc. Mfg. Eng., Sep. 23-25, 1980.

Primary Examiner—Richard L. Schilling
Attorney, Agent, or Firm—Alfred P. Lorenzo

[57] ABSTRACT

Radiation-curable compositions useful for restorative and/or protective treatment of photographic elements are comprised of a polymerizable epoxy compound, a cationic initiator for initiating polymerization of the epoxy compound, a polymerizable acrylic compound, a haloalkylated aromatic ketone which serves as a free-radical initiator for initiating polymerization of the acrylic compound, and a polymerizable organofunctional silane. Photographic elements, such as still films, motion picture films, paper prints, microfiche, and the like, are provided with a protective overcoat layer which is permanently bonded to the element, and serves to protect it from abrasion and scratches, by coating the element with the radiation-curable composition and irradiating the coating to bond it to the element and cure it to form a transparent, flexible, scratch-resistant, cross-linked polymeric layer. The protective overcoat layer can be applied to the image-bearing side of the element or to the support side of the element or to both sides. The radiation-curable composition can also be used as a restorative composition in the treatment of photographic elements which have scratches, abrasion marks, and the like, which impair the appearance or projection capabilities of the element. In use as a restorative composition, the radiation-curable composition can be applied locally in the region of the defects only, to effectively eliminate them and restore the element to a substantially defect-free condition, or it can be applied over the entire surface of the element to both eliminate the defects and form a protective overcoat layer that is capable of providing protection against subsequent scratching or abrasion.

45 Claims, 6 Drawing Figures

RADIATION-CURABLE COMPOSITIONS FOR RESTORATIVE AND/OR PROTECTIVE TREATMENT OF PHOTOGRAPHIC ELEMENTS

FIELD OF THE INVENTION

This invention relates in general to photography and in particular to compositions for restorative and/or protective treatment of photographic elements. More specifically, this invention relates to photographic elements, such as still film, motion picture films, paper prints, microfiche, and the like, to which a radiation-curable composition has been applied to eliminate defects, such as scratches, abrasion marks, and the like, which impair its appearance or projection capabilities, and/or to provide a protective overcoat layer that is capable of providing protection against subsequent scratching or abrasion.

BACKGROUND OF THE INVENTION

Photographic elements having protective overcoat layers are well known and a wide variety of different coating compositions have been proposed in the past for use as protective overcoats. Such overcoats serve a number of different purposes, such as to provide protection against fingerprints, abrasion and scratching, to protect against water spotting, to provide a particular surface texture such as a matte surface, to provide protection against blocking, and to act as anti-reflection layers which reduce glare. Layers of a temporary nature which are intended to be removed after they have served their purpose and layers which are permanently bonded to the photographic element have been described in the prior art. Protective overcoats can be applied to photographic elements by coating solutions or dispersions of film-forming agents in organic solvents such as are described, for example, in U.S. Pat. Nos. 2,259,009; 2,331,746; 2,706,686; 3,113,867; 3,190,197 and 3,415,670; by coating of aqueous film-forming compositions such as are described, for example, in U.S. Pat. Nos. 2,173,480; 2,798,004; 3,502,501 and 3,733,293; by coating of compositions containing discrete, transparent, solid particles of submicroscopic size as described in U.S. Pat. No. 2,536,764; by coating of plasticized polymer compositions as described in U.S. Pat. No. 3,443,946; by coating of polymerized perfluorinated olefins as described in U.S. Pat. No. 3,617,354; and by lamination of a protective layer as described, for example, in U.S. Pat. Nos. 3,397,980 and 3,697,277.

Many of the compositions used in the past to form protective overcoats on photographic elements have suffered from disadvantages which have greatly limited their usefulness. For example, it has been particularly difficult to formulate compositions which are fully satisfactory in providing abrasion and scratch resistance for photographic elements which are commonly subjected to severe conditions in handling and use, such as microfiche and motion picture films. Protective overcoats for such elements must meet exacting requirements with respect to factors such as transparency and flexibility as well as abrasion resistance and scratch resistance, and must be very strongly bonded to the underlying material to avoid the possibility of delamination.

An effective solution to the problem of providing useful protective overcoats for photographic elements, such as microfiche and motion picture films, which are subject to severe conditions of use, is disclosed in U.S. Pat. No. 4,092,173, "Photographic Elements Coated With Protective Overcoats," C. P. Novak, E. D. Morrison and G. M. Leszyk, issued May 30, 1978. As described in this patent, protective overcoats are formed on photographic elements by coating the element with a radiation-curable composition, comprising an acrylated urethane, an aliphatic ethylenically-unsaturated carboxylic acid and a multi-functional acrylate, and irradiating the coating to bond it to the element and cure it to form a transparent, flexible, scratch-resistant, cross-linked polymeric layer. The protective overcoat layer can be applied to the image-bearing side of the element or to the support side of the element or to both sides. As further described in U.S. Pat. No. 4,171,979 "Method Of Treating Scratched Or Abraded Photographic Elements With Radiation-Curable Compositions Comprising An Acrylated Urethane, An Aliphatic Ethylenically-Unsaturated Carboxylic Acid And A Multifunctional Acrylate," C. P. Novak, E. D. Morrison and G. M. Leszyk, issued Oct. 23, 1979, the compositions of U.S. Pat. No. 4,092,173 are also useful as restorative compositions in the treatment of photographic elements, such as still films, motion picture films, paper prints, microfiche, and the like, which have defects such as scratches, abrasion marks, and the like, which impair the appearance or projection capabilities of the element. In use as a restorative composition, the radiation-curable composition can be applied locally in the region of the defects only, to effectively eliminate them and restore the element to a substantially defect-free condition, or it can be applied over the entire surface of the element to both eliminate the defects and form a protective overcoat layer that is capable of providing protection against subsequent scratching or abrasion.

An important improvement to the radiation-curable coating composition of U.S. Pat. Nos. 4,022,173 and 4,171,979 is described in U.S. Pat. No. 4,333,998 "Radiation-Curable Composition for Restorative And/Or Protective Treatment of Photographic Elements" by G. M. Leszyk issued June 8, 1982. The improvement relates to the incorporation in the coating composition of a siloxy-containing polycarbinol, such as a polydimethylsiloxane containing alcohol functional groups grafted onto the siloxane chain, to provide improved wetting, leveling and coating characteristics, to provide improved adhesion to the photographic element, and to provide improved hardness, increased scratch resistance, and reduced coefficient of friction.

While the radiation-curable coating compositions of the aforesaid patents represent an important advance in the art of providing protective overcoats and/or restorative treatments for photographic elements, still further improvement in such compositions would be highly desirable. In particular, it would be especially advantageous to provide a coating composition which exhibits excellent adhesion toward processed photographic emulsion layers and toward all of the various types of support materials commonly used for photographic elements, for example the cellulose acetate support materials and the polyester support materials. In this way, a single formulation can be used to treat a variety of photographic products, as contrasted with the much less advantageous approach of providing a separate formulation tailored to use with each of a variety of products. Furthermore, it would be highly advantageous to provide a coating composition that does not require the presence of an aliphatic ethylenically-unsaturated carboxylic acid, since such acids can create an objectionable odor problem, can contribute to poor shelf-life characteristics, and can bring about undesirable chemical attack on some of the components of photographic elements.

It is toward the objective of providing a novel radiation-curable coating composition that provides the above improvements that the present invention is directed.

SUMMARY OF THE INVENTION

In accordance with this invention, a radiation-curable coating composition, that is especially useful for forming protective overcoats on photograhic elements and/or as a restorative composition for use in treating photographic elements which have defects such as scratches, abrasion marks, and the like, is comprised of:
(1) a polymerizable epoxy compound,
(2) a cationic initiator for initiating polymerization of the epoxy compound,
(3) a polymerizable acrylic compound,
(4) a haloalkylated aromatic ketone which serves as a free-radical initiator for initiating polymerization of the acrylic compound,
and
(5) a polymerization organofunctional silane.

The epoxy compound is particularly advantageous in the formulation in that it provides excellent bonding to the surface of photographic emulsion layers, such as layers formed from conventional gelatin silver halide emulsions. The acrylic compound is particularly advantageous in the formulation in that it provides excellent bonding to the surface of photographic support materials, such as the cellulose acetate and polyester supports that are commonly used in the photographic industry. The polymerizable organofunctional silane serves the important function of promoting adhesion to both emulsion layers and support materials. Since the coating formulation contains both a component whose polymerization is initiated by a cationic initiator and a component whose polymerization is initiated by a free-radical initiator—and thus utilizes two distinctly different polymerization mechanisms—it is referred to hereinafter as a "hybrid" system. While such systems typically suffer from problems of incompatibility of their components—for example, premature polymerization or unwanted physical or chemical interactions between components leading to incomplete cure or pore shelf life—it has been unexpectedly found, in accordance with this invention, that use of the haloalkylated aromatic ketone free-radical initiator effectively avoids incompatibility problems. The hybrid formulation of the invention exhibits little or no odor; has excellent shelf-life; adheres extremely well to processed emulsion layers, to cellulose ester supports and to polyester supports, such as those composed of polyethylene terephthalate; does not chemically attack gelatin or other components of photographic elements; and provides coatings which have excellent characteristics in regard to transparency, flexibility and scratch resistance.

DESCRIPTION OF THE PREFERRED EMBODIMENTS

The radiation-curable compositions described herein can be used to provide protective overcoats and/or to treat scratches, abrasion marks, and similar defects in many different types of photographic elements. For example, the photographic elements can be still films, motion picture films, paper prints, or microfiche. They can be black-and-white elements, color elements formed from a negative in a negative-positive process, or color elements formed directly by a reversal process. Radiation curing of the composition has been found, quite surprisingly, to provide strong bonding to all of these different types of photographic element without in any way adversely affecting the element itself. The photographic elements can comprise any of a wide variety of supports. Typical supports include cellulose nitrate film, cellulose acetate film, poly(vinyl acetal) film, polystyrene film, poly(ethylene terephthalate) film, polycarbonate film, glass, metal, paper, polymer-coated paper, and the like. The image-forming layer or layers of the element typically comprise a radiation-sensitive agent, e.g., silver halide, dispersed in a hydrophilic water-permeable colloid. Suitable hydrophilic vehicles include both naturally-occurring substances such as proteins, for example, gelatin, gelatin derivatives, cellulose derivatives, polysaccharides such as dextran, gum arabic, and the like, and synthetic polymeric substances such as water-soluble polyvinyl compounds like poly(vinylpyrrolidone), acrylamide polymers, and the like. A particularly common example of an image-forming layer is a gelatino/silver halide emulsion layer, and the compositions described herein provide excellent results in treating defects in and providing protective overcoats for such emulsion layers.

In a particular embodiment of the present invention, the protective overcoat is applied only to the image-bearing side of the photographic element. In a second embodiment of the present invention, the protective overcoat is applied only to the support side of the element. In a preferred embodiment of the present invention, the protective overcoat is applied to both sides of the element.

The restorative method of treatment described herein is especially advantageous with motion picture films. Thus, for example, motion picture print film often becomes badly scratched after it has been run through projectors many times. It must then be discarded even though other characteristics may still be acceptable. Use of the restorative coating compositions described herein is highly effective in alleviating scratches that would blemish the projected image, and thus the scratched film can be restored to useful service. The method of this invention is particularly effective with scratches on the support side, which is where scratches most frequently occur on motion picture film. However, the restorative coating compositions described herein will also provide significant improvement with regard to scratches on the image side if such scratches are not too deep.

As previously explained hereinabove, the radiation-curable coating composition of this invention is a hybrid system. Hybrid coating systems have been described heretofore, for example, in U.S. Pat. Nos. 3,753,755, 3,776,729, 3,989,610, 4,025,348, 4,025,407 and 4,156,035. However, the specific needs of the photographic art, which impose especially severe constraints in regard to transparency, flexibility, scratch resistance, abrasion resistance and adhesion, are not easily met and coating compositions of utility in other arts are frequently unsatisfactory in the photographic art. For example, use of a mixture of benzophenone and methyldiethanolamine—a common free-radical initiator system—in a hybrid system containing a free-radical-polymerized acrylic compound and a cationically-polymerized epoxy compound will cause premature polymerization of the epoxy portion of the system due to a substitution reaction of the nucleophilic amine with the oxirane ring, which renders the composition unsatisfactory for use in forming protective overcoats on photographic elements.

The first essential ingredient in the radiation-curable compositions employed in the practice of this invention is a polymerizable epoxy compound. The term "epoxy compound" is used herein to include any compound containing one or more 1,2-epoxy or oxirane rings and is thus inclusive of epoxy monomers, epoxy prepolymers, and oxirane-containing polymers. While any polymerizable epoxy compound can be used in the method and composition of this invention, preferred compounds are the aliphatic or cycloaliphatic multi-functional epoxy compounds.

Examples of particularly preferred polymerizable epoxy compounds for the purposes of this invention include:

(1) polyglycidyl ethers of aliphatic polyols such as:
1,4-butanediol diglycidyl ether
1,6-hexanediol diglycidyl ether
diethyleneglycol diglycidyl ether
and
triethyleneglycol diglycidyl ether (2) epoxycyclohexylalkyl dicarboxylates such as:
bis(3,4-epoxycyclohexylmethyl) pimelate
bis(3,4-epoxy-6-methylcyclohexylmethyl) maleate
bis(3,4-epoxy-6-methylcyclohexylmethyl) succinate
bis(3,4-epoxycyclohexylmethyl) oxalate
bis(3,4-epoxy-6-methylcyclohexylmethyl) sebacate
and
bis(3,4-epoxy-6-methylcyclohexylmethyl) adipate
and (3) epoxides which contain one or more cyclopentane oxide groups such as:
bis(2,3-epoxycyclopentyl) ether
dicyclopentadiene dioxide
glycidyl 2,3-epoxycyclopentyl ether
and
2,3-epoxycyclopentyl cyclopentyl ether.

The second essential ingredient of the radiation-curable composition is a cationic initiator for initiating polymerization of the polymerizable epoxy compound. Particularly useful cationic initiators for the purposes of this invention are the aromatic onium salts, including salts of Group Va elements, such as phosphonium salts, e.g., triphenyl phenacylphosphonium hexafluorophosphate, salts of Group VIa elements, such as sulfonium salts, e.g., triphenylsulfonium tetrafluoroborate, triphenylsulfonium hexafluorophosphate and triphenylsulfonium hexafluoroantimonate, and salts of Group VIIa elements, such as iodonium salts, e.g., diphenyliodonium chloride.

The aromatic onium salts and their use as cationic initiators in the polymerization of epoxy compounds are described in detail in U.S. Pat. No. 4,058,401, "Photocurable Compositions Containing Group VIA Aromatic Onium Salts," by J. V. Crivello issued Nov. 15, 1977; U.S. Pat. No. 4,069,055, "Photocurable Epoxy Compositions Containing Group VA Onium Salts," by J. V. Crivello issued Jan. 17, 1978; U.S. Pat. No. 4,101,513, "Catalyst For Condensation Of Hydrolyzable Silanes And Storage Stable Compositions Thereof," by F. J. Fox et al. issued July 18, 1978; and U.S. Pat. No. 4,161,478, "Photoinitiators," by J. V. Crivello issued July 17, 1979, the disclosures of which are incorporated herein by reference.

Other cationic initiators can also be used in addition to those referred to above; for example, the phenyldiazonium hexafluorophosphates containing alkoxy or benzyloxy radicals as substituents on the phenyl radical as described in U.S. Pat. No. 4,000,115, "Photopolymerization Of Epoxides," by Sanford S. Jacobs issued Dec. 28, 1976, the disclosure of which is incorporated herein by reference.

Preferred cationic initiators for use in the compositions of this invention are the salts of Group VIa elements and especially the sulfonium salts.

The third essential ingredient of the radiation-curable composition is a polymerizable acrylic compound. Useful acrylic compounds include mono-functional monomers and polyfunctional monomers. Examples of mono-functional acrylic monomers that are useful in the compositions of this invention include acrylic and methacrylic esters such as ethyl acrylate, butyl acrylate, 2-hydroxypropyl acrylate, cyclohexyl acrylate, 2-ethylhexyl acrylate, methyl methacrylate, ethyl methacrylate, and the like. Examples of polyfunctional acrylic monomers that are useful include:

neopentylglycol diacrylate
pentaerythritol triacrylate
1,6-hexanediol diacrylate
trimethylolpropane triacrylate
tetraethylene glycol diacrylate
1,3-butylene glycol diacrylate
trimethylolpropane trimethacrylate
1,3-butylene glycol dimethacrylate
ethylene glycol dimethacrylate
pentaerythritol tetraacrylate
tetraethylene glycol dimethacrylate
1,6-hexanediol dimethacrylate
ethylene glycol diacrylate
diethylene glycol diacrylate
glycerol diacrylate
glycerol triacrylate
1,3-propanediol diacrylate
1,3-propanediol dimethacrylate
1,2,4-butanetriol trimethacrylate
1,4-cyclohexanediol diacrylate
1,4-cyclohexanediol dimethacrylate
pentaerythritol diacrylate,
1,5-pentanediol dimethacrylate, and the like.

Preferred polyfunctional acrylic monomers are those of the formula:

wherein each $R^1$ is independently selected from the group consisting of a hydrogen atom and an alkyl group of 1 to 2 carbon atoms, and each $R^2$ is independently selected from the group consisting of an alkyl group of 1 to 6 carbon atoms and a radical of the formula:

in which $R^3$ is a hydrogen atom or an alkyl group of 1 to 2 carbon atoms.

The fourth essential ingredient of the radiation-curable composition is a free-radical initiator for initiating polymerization of the polymerizable acrylic compound. Useful initiators for this purpose are the haloalkylated aromatic ketones. These compounds have been found to be especially useful in the hybrid system described herein in that they are highly effective initiators for the polymerizable acrylic compound and also highly effective in avoiding the incompatibility problems that frequently occur in hybrid systems.

The use of haloalkylated aromatic ketones as free-radical initiators for the polymerization of unsaturated compounds is well known and is described, for example, in U.S. Pat. Nos. 3,686,084, 3,988,228 and 4,043,887, the disclosures of which are incorporated herein by reference.

A preferred class of haloalkylated aromatic ketones for use in the radiation-curable compositions of this invention are the halomethylated benzophenones of U.S. Pat. No. 3,686,084. These compounds have the formula:

wherein $R_1$ is $CH_2X$, $CHX_2$ or $CX_3$ and $R_2$ is H, $CH_3$, $CH_2X$, $CHX_2$ or $CX_3$ where X is chloro, bromo or iodo. Examples of these compounds include the following illustrative species:

p-benzoyl benzyl chloride
p-benzoyl-benzal chloride
p-benzoyl benzotrichloride
p-benzoyl benzyl bromide
p-benzoyl benzal bromide
p-benzoyl benzotribromide
4,4'-bis-chloromethyl benzophenone
4,4'-bis-dichloromethyl benzophenone
4,4'-bis-trichloromethyl benzophenone
4,4'-bis-bromomethyl beneophenone
4,4'-bis-dibromomethyl benzophenone
4,4'-bis-tribromomethyl benzophenone
o-benzoyl benzotrichloride,
and the like.

A second preferred class of haloalkylated aromatic ketones for use in the radiation-curable compositions of this invention are the 3,4-bis(halomethyl)benzophenones of U.S. Pat. No. 4,043,887. These compounds have the formula:

wherein R is hydrogen, chloro, methoxycarbonyl, methyl or t-butyl, and $R^1$ and $R^2$ are the same or different and each is $CH_2X$, $CHX_2$ or $CX_3$ where X is chloro or bromo. Examples of these compounds include the following illustrative species:

3,4-bis(chloromethyl)benzophenone
3,4-bis(chloromethyl)-4'-carbomethoxy benzophenone
3,4-bis(chloromethyl)-4'-chlorobenzophenone
3,4-bis(bromomethyl)-benzophenone
3,4-bis(dichloromethyl)benzophenone
and the like.

Many other haloalkylated aromatic ketones in addition to the preferred halomethylated benzophenones described above can also be used in the radiation-curable compositions of this invention. Examples of such compounds include the bis(alpha-chlorotoluyl)benzene and bis(alpha-bromotoluyl)benzene of U.S. Pat. No. 3,988,228.

The fifth essential ingredient of the radiation-curable composition is a polymerizable organofunctional silane. These compounds are particularly effective as adhesion promoters. The silane can be an epoxy silane which serves as a part of the cationically polymerized component of the hybrid system or an acrylated silane which serves as a part of the free-radical polymerized component of the hybrid system. It is often advantageous to use both an epoxy silane and an acrylated silane to obtain an optimum degree of adhesion-promoting capability and the use of both represents a particularly preferred feature of the present invention.

The epoxy silanes which are utilized are preferably compounds having terminal polymerizable epoxy groups and terminal silane groups which are bridged through an aliphatic, aromatic or mixed aliphatic-aromatic divalent hydrocarbon radical. Particularly preferred silanes are compounds of the formula:

where m is an integer of from 1 to 6, n is an integer of from 1 to 6 and R is an alkyl radical of 1 to 6 carbon atoms, or of the formula:

where m is an integer of from 1 to 6, n is an integer of from 1 to 6, and R is an alkyl radical of 1 to 6 carbon atoms.

Examples of epoxy silanes include the following illustrative species:
gamma-glycidoxypropyl trimethoxysilane
gamma-glycidoxypropyl triethoxysilane beta-glycidoxyethyl trimethoxysilane
gamma-(3,4-epoxycyclohexyl)propyl trimethoxysilane
beta-(3,4-epoxycyclohexyl)ethyl trimethoxysilane
and the like.

The acrylated silanes which are utilized are preferably compounds having terminal polymerizable acryloxy or methacryloxy groups and terminal silane groups which are bridged through an aliphatic, aromatic or mixed aliphatic-aromatic divalent hydrocarbon radical. Particularly preferred acrylated silanes are compounds of the formula:

wherein $R_1$ is hydrogen or a methyl group, n is an integer of from 1 to 6, and R is an alkyl group of 1 to 6 carbon atoms.

Examples of acrylated silanes include the following illustrative species:
beta-acryloxyethyl trimethoxysilane
beta-methacryloxyethyl trimethoxysilane
beta-methacryloxyethyl triethoxysilane
gamma-acryloxypropyl trimethoxysilane
gamma-methacryloxypropyl trimethoxysilane
gamma-methacryloxypropyl triethoxysilane and the like.

Silane compounds other than the epoxy silanes or the acrylated silanes referred to above can be used in the compositions of this invention, if desired. For example, other useful silane compounds include the vinyl silanes such as vinyl chlorosilane, vinyl trimethoxysilane, vinyl triethoxysilane, and vinyl tris(beta-methoxyethoxy)silane.

As explained hereinabove, the radiation-curable compositions of this invention are compositions comprising
(1) a polymerizable epoxy compound,
(2) a cationic initiator for initiating polymerization of the epoxy compound,
(3) a polymerizable acrylic compound,
(4) a haloalkylated aromatic ketone for initiating polymerization of the acrylic compound,
and
(5) a polymerizable organofunctional silane. Mixtures of two or more polymerizable epoxy compounds, of two or more cationic initiators, of two or more polymerizable acrylic compounds, of two or more haloalkylated aromatic ketones, and of two or more polymerizable organofunctional silanes can be used, if desired, and may be advantageous in particular instances. Many other ingredients can also be incorporated in the radiation-curable compositions as further described hereinbelow.

The proportions of each of the five essential components of the radiation-curable composition of this invention can be varied widely, as desired. Typically, the polymerizable epoxy compound is used in an amount of from about 5 to about 50 percent of the total composition on a weight basis, the cationic initiator is used in an amount of from about 0.5 to about 10 percent of the total composition on a weight basis, the polymerizable acrylic compound is used in an amount of from about 20 to about 50 percent of the total composition on a weight basis, the haloalkylated aromatic ketone is used in an amount of from about 0.5 to about 10 percent of the total composition on a weight basis, and the polymerizable organofunctional silane is used in an amount of from about 5 to about 40 percent of the total composition on a weight basis. The optimum amounts to use in a particular instance will depend upon the particular compounds involved and upon the characteristics of the photographic element which is being coated with the radiation-curable formulation.

In a preferred embodiment of the invention, the radiation-curable composition also includes a siloxy-containing polycarbinol. The siloxy-containing polycarbinols, which can also be described as organofunctional silicones having carbinol functionality, are well known materials. Examples of commercially available materials of this class include Dow Corning 193 Surfactant, Dow Corning 1248 Fluid, Dow Corning XF4-3557 Fluid, Dow Corning Q4-3667 Fluid and Dow Corning Q2-8026 Fluid, all of which are available from Dow Corning Corporation, Midland, Mich. These materials are polydimethylsiloxanes containing alcohol functional groups grafted onto the siloxane chain. Illustrative structural formulas of the siloxy-containing polycarbinols are as follows:

and where R is a hydrocarbon radical, typically containing 1 to 10 carbon atoms, and X and Y are integers, typically having a value in the range of from 2 to about 100. The siloxy-containing polycarbinols are described in detail in U.S. Pat. No. 4,130,708, the disclosure of which is incorporated herein by reference.

The radiation-curable compositions of this invention can also contain resins which act as flexibilizers. Useful resins for this purpose include the acrylated epoxy resins, such as those prepared by reaction of epichlorohydrin, bisphenol-A and an acrylic monomer, and the acrylated urethane resins, such as those prepared by reacting a diisocyanate, such as tolylene diisocyanate, with a saturated aliphatic diol, such as 1,4-butane diol or neopentylglycol, and then with an unsaturated alcohol, such as 2-hydroxyethyl acrylate.

The radiation-curable compositions of this invention can also contain matting agents to impart anti-blocking characteristics to layers formed therefrom. Useful matting agents include titanium dioxide, zinc oxide, calcium carbonate, barium sulfate, colloidal silica and polymeric beads formed from cross-linked polymers. Colloidal silica with a particle size of about 4 millimicrons to about 30 microns is particularly useful for this purpose. To reduce the tendency for the silica particles to settle in the coating composition, they can be subjected to an homogenization process. Alternatively, cross-linked polymeric beads, such as beads formed from crosslinked acrylic polymers, can be used in place of the silica particles as they have less tendency to settle.

In the practice of this invention, the particular ingredients and proportion of ingredients in the coating composition that will provide the best results is dependent on the composition of the photographic element. For example, the particular coating compositions which will provide optimum adhesion depend on the particular binder used in the image-bearing layer(s) or, if the element is to be coated on the support side, the particular material used as a support. Generally speaking, it is much easier to obtain adequate adhesion to the support than to obtain adequate adhesion to the image-bearing layer(s). A few simple experiments may be found to be necessary to formulate an optimum coating composition for any particular photographic element.

The photographic elements which are protected with overcoat layers in accordance with this invention are processed to form a visible image prior to being coated on the image-bearing side with the radiation-curable composition. Such processing can be carried out in any suitable manner. For example, black-and-white elements are typically processed in a sequence of steps comprising developing, fixing and washing, color prints in a sequence comprising color developing, bleaching, fixing (or combined bleach-fixing) and stabilizing, and color reversal elements in a sequence comprising black-and-white negative development, followed by reversal exposure or fogging, color development, bleaching, fixing (or combined bleach-fixing) and stabilizing. An advantageous manner of utilizing the invention described herein is to modify the conventional photographic processing operation to include, as final steps in the process following drying of the element, the steps of coating and curing to form the protective overcoat. The coating and curing steps can be carried out in a batch, semi-continuous or continuous manner, as desired.

Coating of the photographic element with the radiation-curable composition can be carried out in any convenient manner. For example, it can be carried out by dip coating, air-knife coating, roll coating, gravure coating, extrusion coating, bead coating, curtain coating, use of wire wound coating rods, and so forth. Typically, the coating deposited on the element will be a very thin coating such as a wet coverage in the range from about 2 to about 20 cubic centimeters of coating composition per square meter of surface coated, more usually in the range from about 3 to about 10 cubic centimeters of coating composition per square meter, and preferably about 5 cubic centimeters of coating composition per square meter. The viscosity of the coating composition can vary widely, depending on the particular method of coating which is chosen. Typically, satisfactory coatings can be readily formed on photographic elements from coating compositions having a viscosity in the range from about 25 to about 1000 centipoises, and more preferably in the range from about 75 to about 200 centipoises.

In that aspect of the present invention which involves using the radiation-curable composition as a restorative composition, the photographic elements which are treated are elements which have been exposed and processed to form a visible image and which, during exposure or processing or more usually during subsequent use, have been abraded or scratched or otherwise treated in a manner to impart defects which impair their appearance or projection capabilities. While scratches or abrasion marks can be incurred in exposure and/or processing, the more typical situation is a gradual accumulation of such defects as a result of use of the element. Thus, the normal use of exposed and processed photographic elements, for example, use of a motion picture film in a projector or of a microfiche in a reader, commonly results in the formation of the kinds of defects which can be removed or at least diminished by the method of this invention.

In using the radiation-curable composition as a restorative composition, it is applied to the photographic element at least in the region of the element in which the defects are located, and is thereafter cured. It can be applied only to such region, since local application to the defects by suitable means such as a brush, or other type of applicator can be utilized, if desired. It will usually be much easier and more convenient, since there will be many small scratches and abrasion marks on the photographic element, to apply the radiation-curable composition over the entire surface or surfaces of the element where the defects appear. In following the latter procedure, coating of the photographic element with the radiation-curable composition can be carried out in any convenient manner. For example, it can be carried out by any of the coating procedures described hereinabove.

The viscosity of the radiation-curable composition used to treat a scratched or abraded photographic element must be sufficiently low that it is able to fill in the scratch or other defect. In other words, the viscosity must not be so high that the composition applied bridges over a scratch with the result that the scratch will remain as a visible defect beneath the transparent cured polymeric material. The optimum viscosity will depend on numerous factors such as the type of element being treated, the method of application of the composition, and the width and depth of the scratch. Typically, viscosities in the range from about 5 to about 600 centipoises are useful for this purpose, with the preferred range being from about 10 to about 100 centipoises, and the most preferred range being from about 30 to about 40 centipoises.

Apparatus and methods for curing of radiation-curable compositions by subjecting them to suitable forms of radiation are well known, and any suitable radiation curing process can be used in carrying out this invention. For example, curing can be carried out by the application of ultraviolet radiation of suitable intensity. High energy ionizing radiation such as X-rays, gamma rays, beta rays and accelerated electrons can also be used to accomplish curing of the coating. Typically, the radiation used should be of a sufficient intensity to penetrate substantially all the way through the coated layer. The total dosage employed should be sufficient to bring about curing of the radiation-curable composition to form a solid plastic. Typically, dosages in the range of about 0.2 to about 50 megarads, more usually in the range from about 0.5 to about 20 megarads, are employed. The coating compositions used in this invention are substantially completely convertible to a solid product so that the removal of solvent or diluents during the curing step is not necessary. Furthermore, they undergo little or no shrinkage upon curing. Accordingly, when a scratch is completely filled in by the radiation-curable composition it remains completely filled in after the curing step is completed. While it is not necessary to employ solvents or diluents which are removed from the coating in the curing step, they can be employed if needed to modify the properties of the coating composition.

It is advantageous to heat the coating, typically at a temperature in the range of from about 40° to about 150° C. for a period of about 1 to about 60 seconds before curing with radiation. This provides the energy necessary to activate the mechanism by which the silane interacts with the substrate surface. A preferred method for supplying the heat is by the use of infrared heaters.

Overcoating of photographic elements in the manner described herein can be advantageously carried out in appropriate cases prior to cutting the element to its final size. Thus, after the photographic element has been processed to a visible image and dried, it can be coated with the radiation-curable composition, then irradiated, and then cut to size. In some instances, it will be sufficient to coat the radiation-curable composition only on the side of the element bearing the image-containing layer(s) or only on the support side. In other instances, it will be desirable to coat the photographic element with radiation-curable composition on both sides. For example, motion picture films and microfiche will typically be coated on both sides in view of the very severe handling that such articles are subject to in ordinary use and the need to reduce to an absolute minimum the formation of scratches on such articles. Both sides of the element can be coated simultaneously or each side can be coated separately depending on the particular method used for coating.

The radiation-curable compositions described herein adhere strongly to both the image-bearing side and the support side of photographic elements, and, accordingly, are effective in providing protective overcoats, or in treating scratches, abrasion marks and other defects, on either or both of the image-bearing side and the support side. They are effective in providing adhesion to materials with which it is ordinarily difficult to achieve adhesion, such as the cellulose triacetate or poly(ethylene terephthalate) which are commonly used as support materials for photographic elements and the gelatino/silver halide emulsion layers or gelatin protective layers commonly employed on the image-bearing side of photographic elements. Irradiation of the composition to cure it to a transparent, flexible, scratch-resistant, cross-linked polymeric layer can be carried out with no significant detrimental effect on the image-bearing layer(s), even with color elements in which the images are dye images.

The invention includes within its scope elements which comprise a photographic support, an image-bearing layer and a protective overcoat layer and elements which do not include an image-bearing layer which are intended to be used in the subsequent preparation of elements having an image-bearing layer.

While the novel radiation-curable compositions of this invention are especially useful as protective and/or restorative compositions for photographic elements, as described in detail hereinabove, they are also useful in many other applications where it is desired to provide protective overcoats. For example, they can be used as protective overcoats for aluminum panels, floor tiles, printing plates, lenses, metallized glass, metallized plastic films, printed circuit boards, and so forth. Other uses include use as an overcoat for sheet metal used in the manufacture of cans and use as an overcoat to provide protection for printing inks on packaging materials.

The invention is further illustrated by the following examples of its practice.

EXAMPLE 1

A radiation-curable coating composition was prepared as follows:

| Component | Weight % |
| --- | --- |
| (1) Pentaerythritol triacrylate | 53.4 |
| (2) Gamma-methacryloxypropyl trimethoxysilane | 12.3 |
| (3) Beta-(3,4-epoxycyclohexyl)ethyl trimethoxysilane | 14.0 |
| (4) 1,4-Butanediol diglycidyl ether | 11.0 |
| (5) 4,4'-Bis-chloromethyl benzophenone | 4.3 |
| (6) Triphenylsulfonium hexafluoroantimonate (50% solution in propylene carbonate) | 5.0 |
|  | 100.0 |

The structural formulae for the components listed above are as follows:

A 35 mm color print motion picture film having a cellulose triacetate support and gelatino/silver halide emulsion layers was exposed, processed, coated on both sides with the coating composition described above using a reverse offset gravure coating process, and cured by passing it at a speed of 50 centimeters per second under a single 118 watt/centimeter high intensity mercury vapor UV lamp at a distance of 6.5 centimeters. The thickness of the cured coating was approximately one micron.

The coated film sample and a control sample that had not been coated were subjected to abrasion and coefficient of friction tests in accordance with standard test procedures. Specifically, the abrasion test, which is referred to as the Taber Abrasion test, was carried out in accordance with Test Procedure D-1044 of the American Society For Testing Materials and the coefficient of friction test, which is referred to as the paper clip test, was carried out in accordance with ANSI Test Method PH1.47-1972 of the American National Standards Institute, Inc., 1430 Broadway, New York, N.Y., U.S.A. 10018.

Another 35 mm color print motion picture film, having a polyethylene terephthalate support, was exposed, processed, coated and cured in the same manner described above. This coated film sample, and a control sample that had not been coated, were also subjected to the abrasion and coefficient of friction tests referred to above.

Results obtained are reported in Table I below and in FIGS. 1, 2 and 3 which relate, respectively, to the coating on the emulsion side, the coating on the cellulose triacetate support, and the coating on the polyethylene terephthalate support. In regard to the abrasion test data, the percent haze is an indication of the degree of abrasion damage. The higher the percent haze at a given number of Taber Abrasion cycles the lower the abrasion resistance of the surface being tested.

TABLE I

| Surface | Coefficient of Friction | |
|---|---|---|
|  | Uncoated | Overcoated |
| Emulsion | 0.20 | 0.42 |
| Cellulose triacetate | 0.30 | 0.40 |
| Polyethylene terephthalate | 0.16 | 0.38 |

Figure 1:
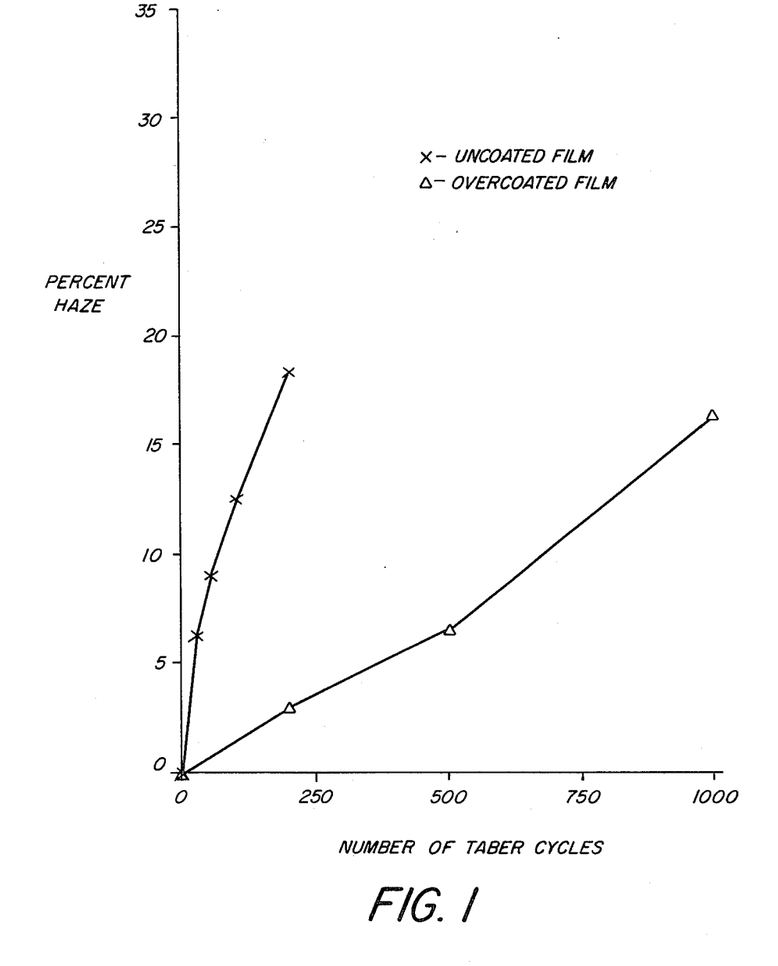
FIG. 1 is a graph plotting percent haze as a function of the number of Taber Abrasion cycles for both a photographic film having a protective overcoat on the emulsion side thereof, in accordance with the invention, and the same film without such an overcoat.
Figure 2:
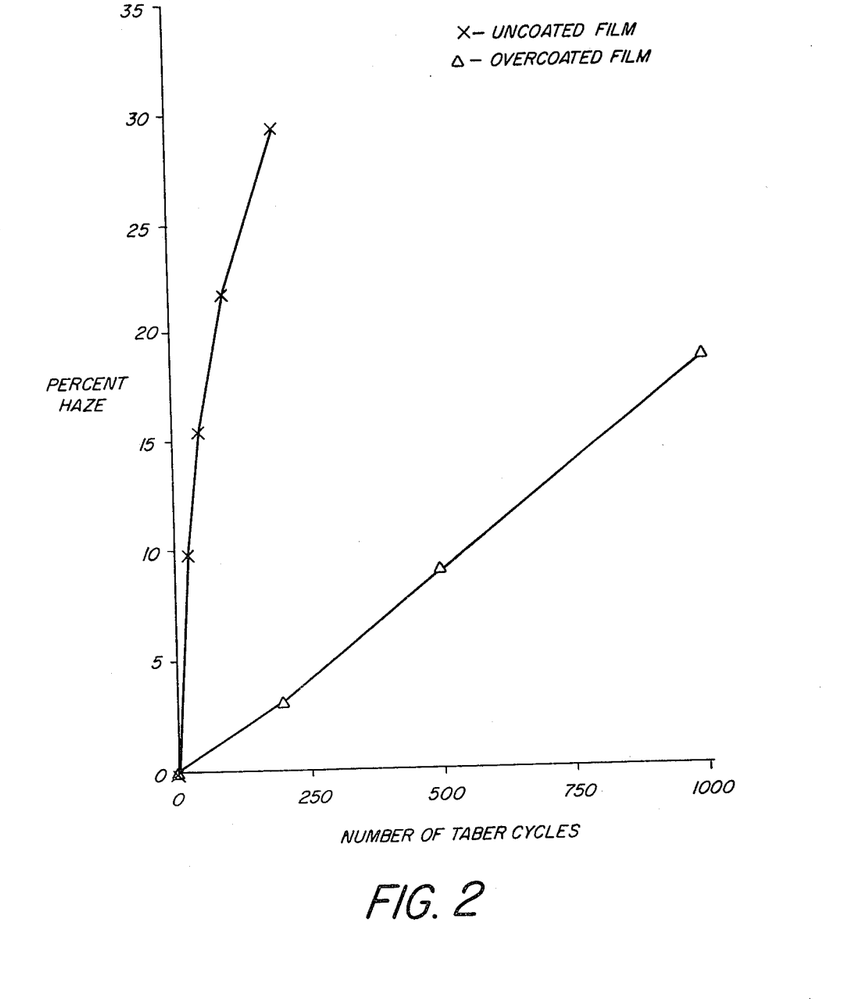
FIGS. 2 and 3 are similar graphs to FIG. 1 relating to the same overcoat composition coated on the support side of photographic films having cellulose triacetate and polyethylene terephthalate supports, respectively.
Figure 3:
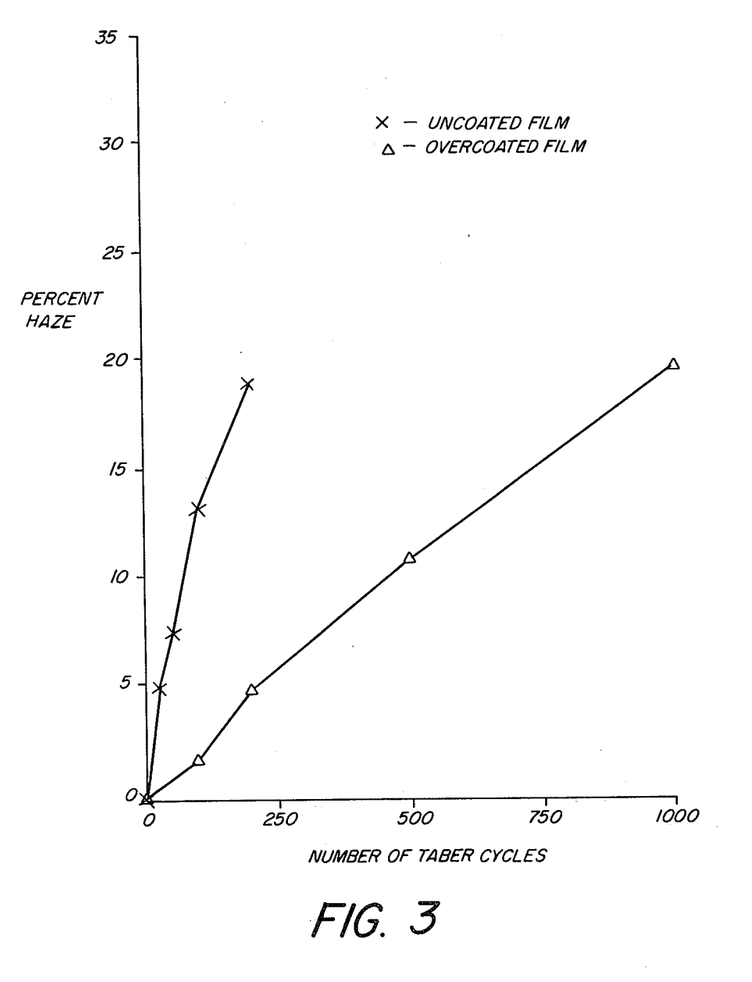

As shown by the data in FIGS. 1 to 3, the protective overcoat provided a major improvement in abrasion resistance for the emulsion surface, for the cellulose triacetate surface and for the polyethylene terephthalate surface. For example, at a level of 200 Taber cycles the percent haze was reduced for the emulsion surface from about 18% to about 3%, for the cellulose triacetate from about 30% to about 3%, and for the polyethylene terephthalate from about 19% to about 5%.

EXAMPLE 2

A radiation-curable coating composition was prepared as follows:

| Component | Weight % |
|---|---|
| (1) Pentaerythritol triacrylate | 26.6 |
| (2) Gamma-methacryloxypropyl trimethoxysilane | 11.8 |
| (3) 1,4-Butanediol diglycidyl ether | 11.8 |
| (4) Gamma-glycidoxypropyl trimethoxysilane | 11.8 |
| (5) Bis(3,4-epoxy-6-methylcyclohexylmethyl) adipate | 26.6 |
| (6) 4,4'-Bis-chloromethyl benzophenone | 3.9 |
| (7) Triphenylsulfonium hexafluoroantimonate (50% solution in propylene carbonate) | 5.9 |
| (8) Colloidal silica | 1.0 |
| (9) Siloxy-containing polycarbinol | 0.6 |
|  | 100.0 |

The gamma-glycidoxypropyl trimethoxysilane utilized in the composition can be represented by the formula:

while the bis(3,4-epoxy-6-methylcyclohexylmethyl) adipate can be represented by the formula:

The colloidal silica that was employed was Cab-O-Sil HS-5, a fused amorphous silica available from Cabot Corporation, and the siloxy-containing polycarbinol was Dow Corning Q4-3667 Fluid available from Dow Corning Corporation.

In the formulation described above, the pentaerythritol triacrylate contributes to a high degree of cross linking and thereby provides excellent abrasion resistance. The gamma-methacryloxypropyl trimethoxysilane acts as an adhesion promotor by bridging the coating-substrate interface. In this compound, the silane end of the molecule interacts with the substrate surface, leaving the methacrylate end to bond into the coating as it cures through radical chain polymerization with other acrylic species. The 1,4-butanediol diglycidyl ether acts as a reactive viscosity reducer. It also plays an important role in improving the adhesion of the coating composition to cellulose triacetate. The exact reason for this is not understood, but the mechanism may involve improved wetting of the surface due to viscosity reduction or chemical interaction of the 1,4-butanediol diglycidyl ether with the cellulose triacetate. Both of these mechanisms may be involved. The gamma-glycidoxypropyl trimethoxysilane functions so that the silane end of the molecule interacts with the substrate surface while the epoxy end bonds into the coating as it cures through cationic polymerization with other epoxide species. The bis(3,4-epoxy-6-methylcyclohexylmethyl) adipate constitutes the major component of the epoxy portion of the hybrid system. It is a highly reactive epoxy monomer which provides for high rates of cationic polymerization in the system, and contributes a desired degree of flexibility to the overcoat. The 4,4'-bis-chloromethyl benzophenone and the triphenylsulfonium hexafluoroantimonate serve as the free-radical initiator and cationic initiator, respectively. This combination of initiators functions in a synergistic manner due to electron and energy transfer from photogenerated radicals. Also, the photo-decomposition of aromatic onium salts, such as triphenylsulfonium hexafluoroantimonate, produces species which act as proton donors for radical initiators, such as 4,4'-bis-chloromethyl benzophenone, which extract protons to form radicals. The propylene carbonate is used to solubilize the cationic initiator and, upon curing, it becomes part of the cross-linked polymeric structure. The colloidal silica is included in the composition to reduce blocking of the protective overcoat. The siloxy-containing polycarbinol acts as a slip agent and provides permanent lubrication of the surface of the protective coating, a result which is highly desirable with motion picture film. The hydroxy functionality of the siloxy-containing polycarbinol is believed to bond into the epoxy portion of the coating by terminating a cationic polymerization site.

The same 35 mm color print motion picture films described in Example 1, having cellulose triacetate and polyethylene terephthalate supports, respectively, were exposed, processed, coated and cured in the same manner described in Example 1 using the coating formulation described in this example. The coated samples and controls were subjected to the same abrasion and coefficient of friction tests. Results obtained are reported in Table II below and in FIGS. 4, 5 and 6 which relate respectively to the coating on the emulsion side, the coating on the cellulose triacetate support, and the coating on the polyethylene terephthalate support.

TABLE II

| Surface | Coefficient of Friction | |
|---|---|---|
| | Uncoated | Coated |
| Emulsion | 0.16 | 0.21 |
| Cellulose triacetate | 0.24 | 0.21 |
| Polyethylene terephthalate | 0.16 | 0.24 |

Figure 4:
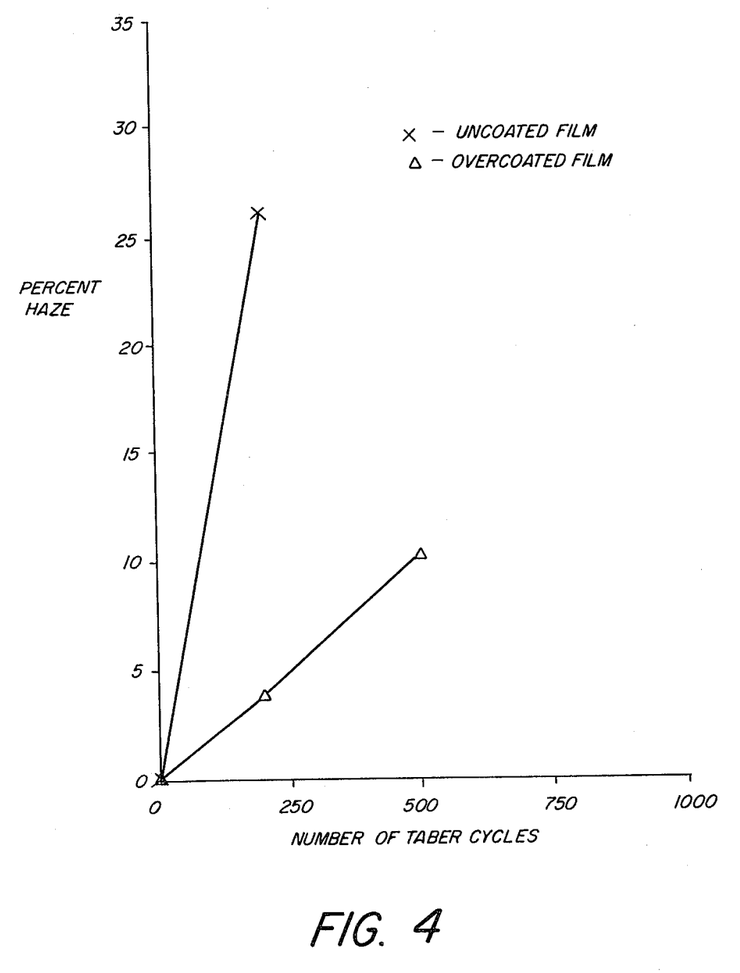
FIG. 4 is a similar graph to FIG. 1 relating to an overcoat of different composition on the emulsion side of the photographic film.
Figure 5:
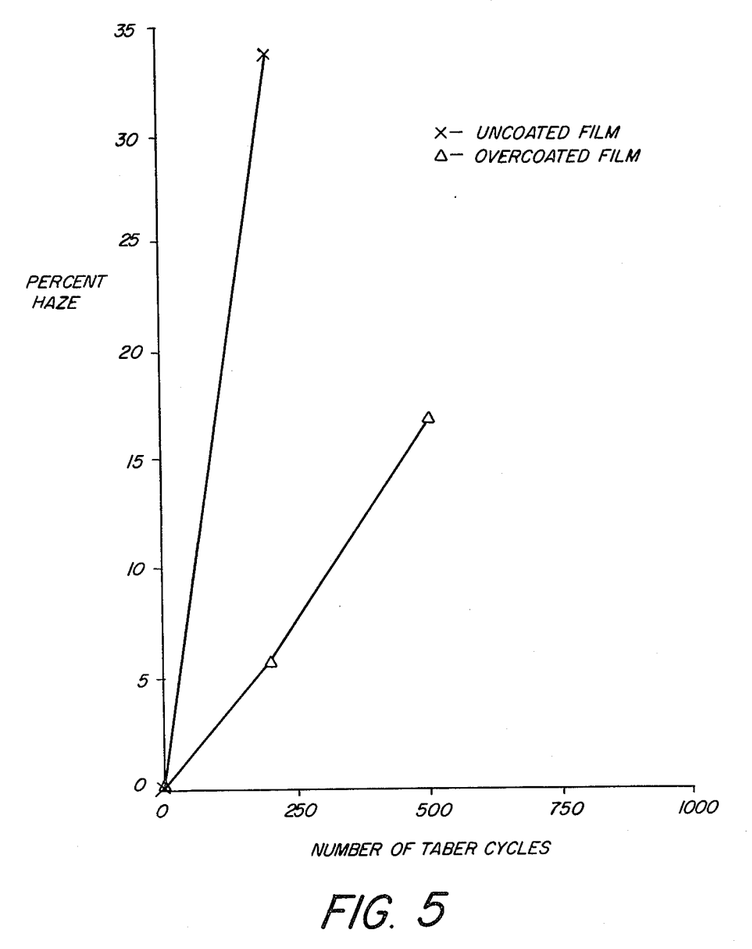
FIGS. 5 and 6 are similar graphs to FIG. 4 relating to the same overcoat composition coated on the support side of photographic films having cellulose triacetate and polyethylene terephthalate supports, respectively.
Figure 6:
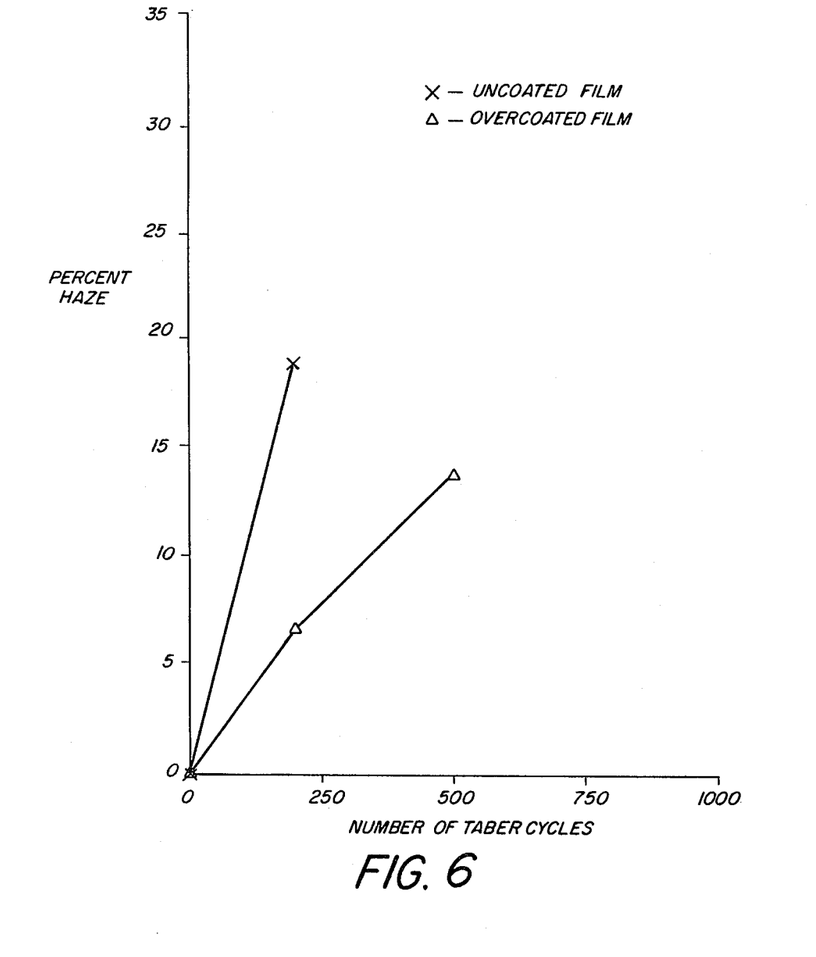

As shown by the data in FIGS. 4 to 6, the protective overcoat provided a major improvement in abrasion resistance for the emulsion surface, for the cellulose triacetate surface, and for the polyethylene terephthalate surface. For example, at a level of 200 Taber cycles, the percent haze was reduced for the emulsion surface from about 26% to about 4%, for the cellulose triacetate from about 341 % to about 6%, and for the polyethylene terephthalate from about 19% to about 7%. As compared with the formulation of Example 1, the formulation of Example 2 provided much lower coefficient of friction values. This desirable result is attributable to the presence of the siloxy-containing polycarbinol in the formulation of Example 2. The coefficient of friction could be further reduced, if desired, by increasing the concentration of this compound. The formulation of Example 2 was also superior to that of Example 1 in that it provided a protective overcoat that was less brittle at low humidities.

The radiation-curable compositions described herein are highly effective in forming protective overcoat layers and in eliminating or reducing defects such as scratches, abrasion marks, and the like, in photographic elements. They have excellent wetting, leveling, and coating characteristics which facilitate their application to photographic elements. They adhere strongly to photographic elements—including the emulsion surface and the surfaces of support materials such as cellulose triacetate and polyethylene terephthalate—and are easily cured with convenient and readily available radiation sources to form transparent, flexible and highly scratch resistant protective coatings. The coating compositions have excellent shelf-life, are free of objectionable odors, and do not exhibit undesirable chemical attack on the components of photographic elements. A further important advantage is that the resulting overcoat layers are resistant to solvents, such as the chlorinated hydrocarbons which are typically used to clean motion picture films.

The hybrid system described herein is also advantageous in that it has a much faster cure rate than many systems which contain only epoxy compounds and a cationic initiator for initiating polymerization thereof. This is an important advantage in that a photographic element, such as a motion picture film, can be overcoated with the composition and cured at a high rate of speed, for example by passing it beneath a suitable source of UV radiation at speeds of 50 centimeters per second or higher. Moreover, even when curing is carried out in a very rapid manner, the degree of adhesion of the overcoat to the underlying substrate is fully adequate to withstand the stresses encountered in normal handling and use.

With the combination of initiators described herein, that is, the combination of a cationic initiator with a haloalkylated aromatic ketone that functions as a free-radical initiator, it is feasible to incorporate both an epoxy compound and an acrylic compound in the system in large amounts, for example, the system can be a mixture of substantially equal amounts of each on a weight basis. This is in marked contrast to the use of other initiator systems which permit only a small percentage of an acrylic compound in a predominantly epoxy system or a small percentage of an epoxy compound in a predominantly acrylic system. (See, for example, the hybrid systems described in the article, "New Developments In Photo-Induced Cationic Polymerizations," by W. C. Perkins, Proceedings—Radiation Curing V, Soc. Mfg. Eng. Sept. 23-25, 1980, which utilize benzophenone as the free radical initiator and which are predominantly comprised of epoxy compound, e.g., the acrylic component represents only about 15 to 20 weight percent of the total hybrid formulation. Use of substantially greater amounts of the acrylic component in those benzophenone-initiated systems is not feasible as it prevents the formulation from curing properly).

Hybrid coating systems outside the scope of the present invention tend to have severe problems of incompatability, that is, the occurrence of adverse physical and/or chemical interactions between components. In particular, the free-radical initiator and the cationic initiator can interact chemically in such a way that one tends to "poison" the other and thereby render it ineffective for its intended purpose. The coating composition can exhibit a pronounced tendency to thicken and harden prior to such time as it is exposed to UV or other radiation—in fact, within a very short period of time after it is formulated such as a matter of a few hours or a few days—and thus to have an inadequate shelf-life. Use of the haloalkylated aromatic ketones as free-radical initiators in the hybrid systems of this invention has been unexpectedly found to effectively avoid such problems and to provide a long shelf life, for example, a shelf life of several months or more.

The invention has been described in detail with particular reference to preferred embodiments thereof, but it will be understood that variations and modifications can be effected within the spirit and scope of the invention.

We claim:

1. A radiation-curable coating composition comprising:
   (1) a polymerizable epoxy compound,
   (2) a cationic initiator for initiating polymerization of said epoxy compound,
   (3) a polymerizable acrylic compound,
   (4) a free-radical initiator for initiating polymerization of said acrylic compound, said free-radical initiator comprising a haloalkylated aromatic ketone, and
   (5) a polymerizable organofunctional silane.

2. A radiation-curable coating composition as claimed in claim 1 wherein said epoxy compound is an aliphatic or cycloaliphatic multifunctional epoxy compound.

3. A radiation-curable coating composition as claimed in claim 1 wherein said epoxy compound is a polyglycidyl ether of an aliphatic polyol.

4. A radiation-curable coating composition as claimed in claim 1 wherein said epoxy compound is an epoxycyclohexylalkyl dicarboxylate.

5. A radiation-curable coating composition as claimed in claim 1 wherein said epoxy compound contains one or more cyclopentane oxide groups.

6. A radiation-curable coating composition as claimed in claim 1 wherein said cationic initiator is an aromatic onium salt.

7. A radiation-curable coating composition as claimed in claim 1 wherein said cationic initiator is an aromatic onium salt of a Group VIa element.

8. A radiation-curable coating composition as claimed in claim 1 wherein said cationic initiator is a sulfonium salt.

9. A radiation-curable coating composition as claimed in claim 1 wherein said acrylic compound is a polyfunctional acrylic monomer.

10. A radiation-curable coating composition as claimed in claim 1 wherein said acrylic compound is a polyfunctional acrylic monomer of the formula:

wherein each $R^1$ is independently selected from the group consisting of a hydrogen atom and an alkyl group of 1 to 2 carbon atoms, and each $R^2$ is independently selected from the group consisting of an alkyl group of 1 to 6 carbon atoms and a radical of the formula:

in which $R^3$ is a hydrogen atom or an alkyl group of 1 to 2 carbon atoms.

11. A radiation-curable coating composition as claimed in claim 1 wherein said haloalkylated aromatic ketone is a halomethylated benzophenone.

12. A radiation-curable coating composition as claimed in claim 1 wherein said haloalkylated aromatic ketone is a halomethylated benzophenone of the formula:

where $R^1$ is $CH_2X$, $CHX_2$ or $CX_3$ and $R_2$ is H, $CH_3$, $CH_2X$, $CHX_2$ or $CX_3$ where X is chloro, bromo or iodo.

13. A radiation-curable coating composition as claimed in claim 1 wherein said haloalkylated aromatic ketone is a 3,4-bis(halomethyl)benzophenone of the formula:

wherein R is hydrogen, chloro, methoxycarbonyl, methyl or t-butyl and $R^1$ and $R^2$ are the same or different and each is $CH_2X$, $CHX_2$ or $CX_3$ where X is chloro or bromo.

14. A radiation-curable coating composition as claimed in claim 1 wherein said haloalkylated aromatic ketone is 4,4'-bis-chloromethyl benzophenone.

15. A radiation-curable coating composition as claimed in claim 1 wherein said polymerizable organofunctional silane is an epoxy silane of the formula:

where m is an integer of from 1 to 6, n is an integer of from 1 to 6, and R is an alkyl radical of 1 to 6 carbon atoms.

16. A radiation-curable coating composition as claimed in claim 1 wherein said polymerizable organofunctional silane is an epoxy silane of the formula:

where m is an integer of from 1 to 6, n is an integer of from 1 to 6, and R is an alkyl radical of 1 to 6 carbon atoms.

17. A radiation-curable coating composition as claimed in claim 1 wherein said polymerizable organofunctional silane is an acrylated silane of the formula:

wherein $R_1$ is hydrogen or a methyl group, n is an integer of from 1 to 6 and R is an alkyl group of 1 to 6 carbon atoms.

18. A radiation-curable coating composition as claimed in claim 1 additionally containing a siloxy-containing polycarbinol.

19. A radiation-curable coating composition as claimed in claim 1 additionally containing a siloxy-containing polycarbinol of the formula:

where R is a hydrocarbon radical containing 1 to 10 carbon atoms and x is an integer having a value in the range of from 2 to 100.

20. A radiation-curable coating composition as claimed in claim 1 additionally containing a siloxy-containing polycarbinol of the formula:

where R is a hydrocarbon radical containing 1 to 10 carbon atoms and x and y are integers having a value in the range of from 2 to 100.

21. A radiation-curable coating composition comprising:
(1) a polymerizable epoxy compound,
(2) a cationic initiator for initiating polymerization of said epoxy compound,
(3) a polymerizable acrylic compound,
(4) a free-radical initiator for initiating polymerization of said acrylic compound, said free-radical initiator comprising a haloalkylated aromatic ketone,
(5) an epoxy silane,
(6) an acrylated silane,
(7) a siloxy-containing polycarbinol,
and
(8) a matting agent.

22. A radiation-curable coating composition comprising:
(1) pentaerythritol triacrylate,
(2) gamma-methacryloxypropyltrimethoxysilane,
(3) 1,4-butanediol diglycidyl ether,
(4) gamma-glycidoxypropyl trimethoxysilane,
(5) bis(3,4-epoxy-6-methylcyclohexylmethyl) adipate,
(6) 4,4'-bis-chloromethyl benzophenone,
(7) triphenylsulfonium hexafluoroantimonate,
(8) colloidal silica,
and
(9) a siloxy-containing polycarbinol.

23. A photographic element comprising:
(1) a support,
(2) at least one image-bearing layer,
and
(3) a protective overcoat layer which is permanently bonded to at least one side of said element, said protective overcoat layer having been formed by (a) coating said element with a radiation-curable coating composition which forms a transparent, flexible, scratch-resistant, crosslinked polymeric layer upon radiation curing, said coating composition comprising: (1) a polymerizable epoxy compound, (2) a cationic initiator for initiating polymerization of said epoxy compound, (3) a polymerizable acrylic compound, (4) a free-radical initiator for initiating polymerization of said acrylic compound, said free-radical initiator comprising a haloalkylated aromatic ketone, and (5) a polymerizable organofunctional silane, and (b) subjecting said coating to radiation sufficient to cure said coating and bond it to said element.

24. A photographic element comprising:
(1) a support,
(2) at least one image-bearing layer,
and
(3) a protective overcoat layer which is permanently bonded to the image-bearing side of said element; said protective overcoat layer having been formed by (a) coating said image-bearing side with a radiation-curable coating composition which forms a transparent, flexible, scratch-resistant, cross-linked polymeric layer upon radiation curing, said coating composition comprising (1) a polymerizable epoxy compound, (2) a cationic initiator for initiating polymerization of said epoxy compound, (3) a polymerizable acrylic compound, (4) a free-radical initiator for initiating polymerization of said acrylic compound, said free-radical initiator comprising a haloalkylated aromatic ketone, and (5) a polymerizable organofunctional silane, and (b) subjecting said coating to radiation sufficient to cure said coating and bond it to said image-bearing side.

25. A photographic element comprising:
(1) a support,
(2) at least one image-bearing layer,
and
(3) a protective overcoat layer which is permanently bonded to the support side of said element; said protective overcoat layer having been formed by (a) coating said support side with a radiation-curable coating composition which forms a transparent, flexible, scratch-resistant, cross-linked polymeric layer upon radiation curing, said coating composition comprising:
(1) a polymerizable epoxy compound,
(2) a cationic initiator for initiating polymerization of said epoxy compound,
(3) a polymerizable acrylic compound,
(4) a free-radical initiator for initiating polymerization of said acrylic compound, said free-radical initiator comprising a haloalkylated aromatic ketone, and (5) a polymerizable organofunctional silane, and (b) subjecting said coating to radiation sufficient to cure said coating and bond it to said support side.

26. A photographic element comprising:
(1) a support,
(2) at least one image-bearing layer,
and
(3) protective overcoat layers which are permanently bonded to both the image-bearing side of said element and the support side of said element, each said protective overcoat layer having been formed by (a) coating the respective side with a radiation-curable coating composition which forms a transparent, flexible, scratch-resistant, cross-linked polymeric layer upon radiation curing, said coating composition comprising:
(1) a polymerizable epoxy compound,
(2) a cationic initiator for initiating polymerization of said epoxy compound,
(3) a polymerizable acrylic compound,
(4) a free-radical initiator for initiating polymerization of said acrylic compound, said free-radical initiator comprising a haloalkylated aromatic ketone, and (5) a polymerizable organofunctional silane and (b) subjecting said coating to radiation sufficient to cure said coating and bond it to said element.

27. A photographic element comprising
(1) a support,
(2) at least one image-bearing layer, and (3) protective overcoat layers which are permanently bonded to both the image-bearing side of said element and the support side of said element, each said protective overcoat layer having been formed by (a) coating the respective side with a radiation-curable coating composition which forms a transparent, flexible, scratch-resistant, cross-linked polymeric layer upon radiation curing, said coating composition comprising:
(1) a polymerizable epoxy compound,
(2) a cationic initiator for initiating polymerization of said epoxy compound,
(3) a polymerizable acrylic compound,
(4) a free-radical initiator for initiating polymerization of said acrylic compound, said free-radical initiator comprising a haloalkylated aromatic ketone,
(5) an epoxy silane,
(6) an acrylated silane,
(7) a siloxy-containing polycarbinol, and
(8) a matting agent, and (b) subjecting said coating to ultraviolet radiation sufficient to cure it and bond it to the side of said element on which it is coated.

28. A photographic element as claimed in claim 27 wherein said cationic initiator is a sulfonium salt and said free-radical initiator is a halomethylated benzophenone.

29. A photographic element as claimed in claim 27 wherein said epoxy compound is a mixture of 1,4-butanediol diglycidyl ether and bis(3,4-epoxy-6-methylcyclohexylmethyl) adipate, said cationic initiator is triphenylsulfonium hexafluoroantimonate, said acrylic compound is pentaerythritol triacrylate, said free-radical initiator is 4,4'-bis-chloromethyl benzophenone, said epoxy silane is gamma-glycidoxypropyl trimethoxysilane, said acrylated silane is gamma-methacryloxypropyl trimethoxysilane, and said matting agent is colloidal silica.

30. A photographic element as claimed in claim 26 wherein said support is a cellulose triacetate support and said image-bearing layer is an imagewise-exposed and processed gelatino/silver halide emulsion layer.

31. A photographic element as claimed in claim 26 wherein said support is a poly(ethylene terephthalate) support and said image-bearing layer is an imagewise-exposed and processed gelatino/silver halide emulsion layer.

32. An element comprising a photographic support and a protective overcoat layer, said protective overcoat layer having been formed by (a) coating said element with a radiation-curable coating composition which forms a transparent, flexible, scratch-resistant, cross-linked polymeric layer upon radiation curing, said coating composition comprising (1) a polymerizable epoxy compound, (2) a cationic initiator for initiating polymerization of said epoxy compound, (3) a polymerizable acrylic compound, (4) a free-radical initiator for initiating polymerization of said acrylic compound, said free-radical initiator comprising a haloalkylated aromatic ketone, and (5) a polymerizable organofunctional silane, and (b) subjecting said coating to radiation sufficient to cure said coating and bond it to said element.

33. A method of protecting a photographic element against abrasion and scratches which comprises (a) coating at least one side of said element with a radiation-curable coating composition comprising (1) a polymerizable epoxy compound, (2) a cationic intiator for initiating polymerization of said epoxy compound, (3) a polymerizable acrylic compound, (4) a free-radical initiator for initiating polymerization of said acrylic compound, said free-radical initiator comprising a haloalkylated aromatic ketone, and (5) a polymerizable organofunctional silane, and (b) subjecting said coating to radiation sufficient to cure said coating and bond it to said element.

34. A method for protecting a photographic element against abrasion and scratches which comprises (a) coating both sides of said element with a radiation-curable coating composition comprising (1) a polymerizable epoxy compound, (2) a cationic initiator for initiating polymerization of said epoxy compound, (3) a polymerizable acrylic compound, (4) a free-radical initiator for initiating polymerization of said acrylic compound, said free-radical initiator comprising a haloalkylated aromatic ketone, and (5) a polymerizable organofunctional silane, and (b) subjecting each said coating to radiation sufficient to cure it and bond it to the side of the element on which it is coated.

35. A method as claimed in claim 34 wherein said composition contains an epoxy silane, an acrylated silane, and a siloxy-containing polycarbinol.

36. A method as claimed in claim 34 wherein said cationic initiator is a sulfonium salt.

37. A method as claimed in claim 34 wherein said free-radical initiator is a halomethylated benzophenone.

38. A method of treating a photographic element comprising a support and at least one image-bearing layer, said element having defects such as scratches, abrasion marks and the like on one or both sides thereof which impair the appearance or projection capabilities of said element, which method comprises (a) applying to said element, at least in the region of said element in which said defects are located, a radiation-curable composition which fills in said defects and forms a transparent, flexible, scratch-resistant, cross-linked polymeric material upon radiation curing, said composition comprising (1) a polymerizable epoxy compound, (2) a cationic initiator for initiating polymerization of said epoxy compound, (3) a polymerizable acrylic compound, (4) a free-radical initiator for initiating polymerization of said acrylic compound, said free-radical initiator comprising a haloalkylated aromatic ketone, and (5) a polymerizable organofunctional silane, and (b) subjecting said composition to radiation sufficient to cure it and bond it to said element, whereby the adverse effects of said defects on the appearance or projection capabilities of said element are reduced or eliminated.

39. A method as claimed in claim 38 wherein said radiation-curable composition has a viscosity in the range of from about 10 to about 100 centipoises.

40. A method as claimed in claim 38 wherein said radiation-curable composition is applied only to the region of said element in which said defects are located.

41. A method as claimed in claim 38 wherein said radiation-curable composition covers at least one entire surface of said element.

42. A method as claimed in claim 38 wherein said support is a cellulose triacetate support and said image-bearing layer is an imagewise-exposed and processed gelatino/silver halide emulsion layer.

43. A method as claimed in claim 38 wherein said support is a poly(ethylene terephthalate) support and said image-bearing layer is an imagewise-exposed and processed gelatino/silver halide emulsion layer.

44. A method of treating a photographic motion picture film comprising a poly(ethylene terephthalate) support and at least one imagewise-exposed and processed gelatino/silver halide emulsion layer, said film having scratches in said support which impair its projection capabilities, which method comprises (a) coating said support with a radiation-curable composition which fills in said scratches and forms a transparent, flexible, scratch-resistant, cross-linked polymeric layer upon radiation curing, said composition comprising (1) a polymerizable epoxy compound, (2) a cationic initiator for initiating polymerization of said epoxy compound, (3) a polymerizable acrylic compound, (4) a free-radical initiator for initiating polymerization of said acrylic compound, said free-radical initiator comprising a haloalkylated aromatic ketone, and (5) a polymerizable organofunctional silane and (b) subjecting said coating to radiation sufficient to cure it and bond it to said support, whereby the adverse effects of said scratches on the projection capabilities of said film are reduced or eliminated.

45. A method of treating a photographic motion picture film comprising a cellulose triacetate support and at least one imagewise-exposed and processed gelatino/silver halide emulsion layer, said film having scratches in said support which impair its projection capabilities, which method comprises (a) coating said support with a radiation-curable composition which fills in said scratches and forms a transparent, flexible, scratch-resistant, cross-linked polymeric layer upon radiation curing, said composition comprising (1) a polymerizable epoxy compound, (2) a cationic initiator for initiating polymerization of said epoxy compound, (3) a polymerizable acrylic compound, (4) a free-radical initiator for initiating polymerization of said acrylic compound, said free-radical initiator comprising a haloalkylated aromatic ketone, and (5) a polymerizable organofunctional silane and (b) subjecting said coating to radiation sufficient to cure it and bond it to said support, whereby the adverse effects of said scratches on the projection capabilities of said film are reduced or eliminated.

* * * * *